Oct. 3, 1967 G. R. LAWSON ET AL 3,344,815
STRAP TIGHTENING AND CUTTING TOOL
Filed Aug. 28, 1964 2 Sheets-Sheet 1
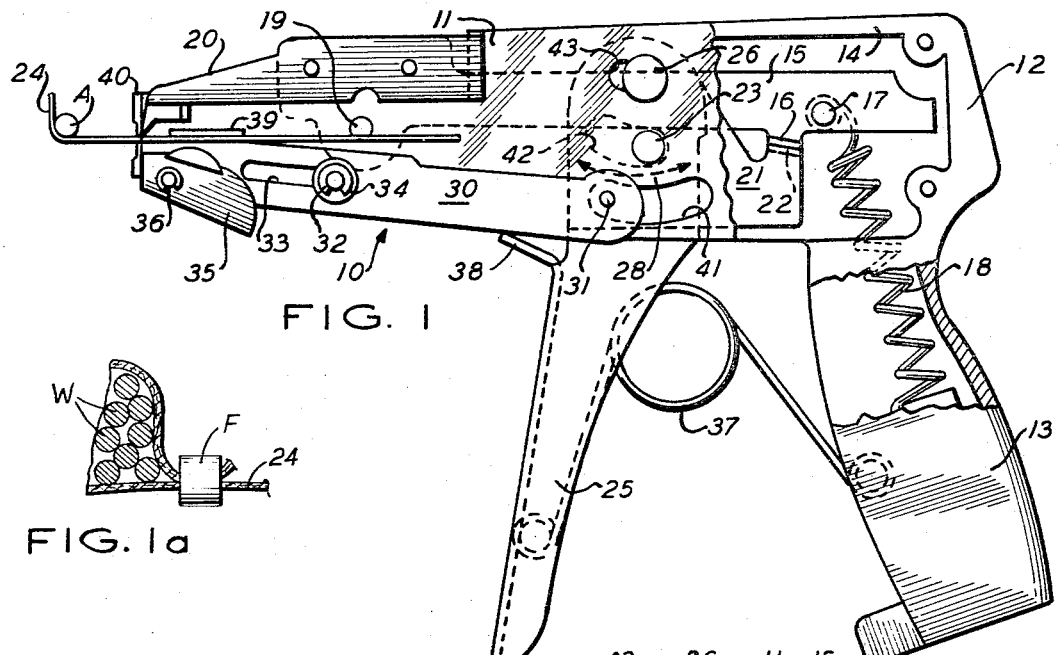
FIG. 1
FIG. 1a
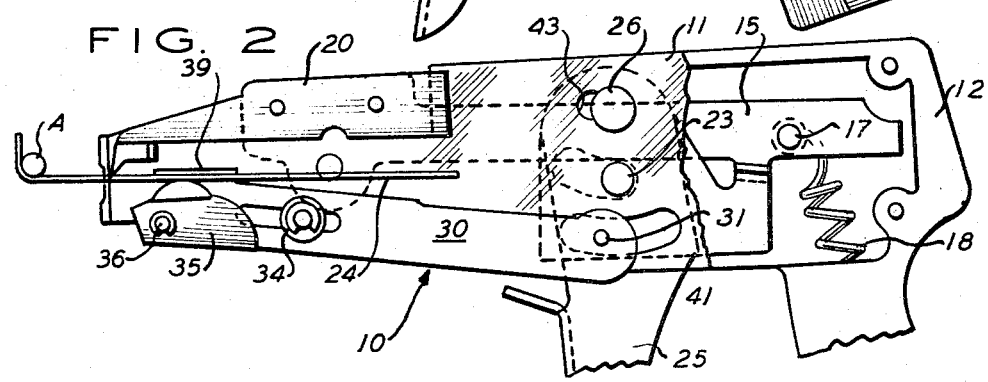
FIG. 2
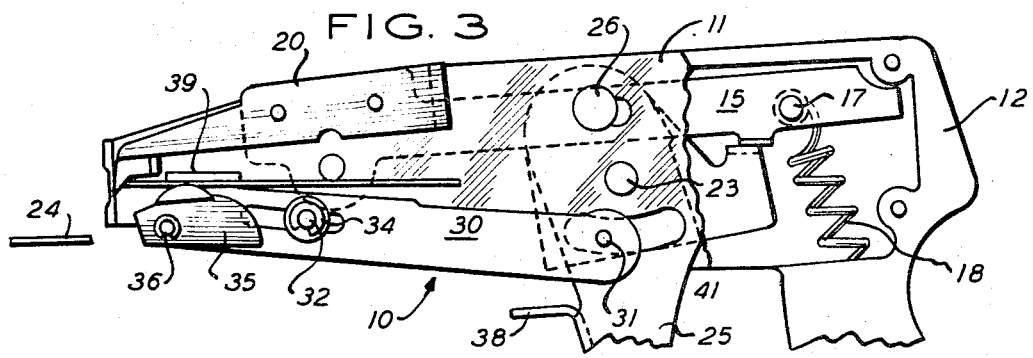
FIG. 3
INVENTORS
G. R. LAWSON
G. C. BAILEY
BY
*Harry Grimm*
ATTORNEY Oct. 3, 1967 G. R. LAWSON ET AL 3,344,815
STRAP TIGHTENING AND CUTTING TOOL
Filed Aug. 28, 1964 2 Sheets-Sheet 2
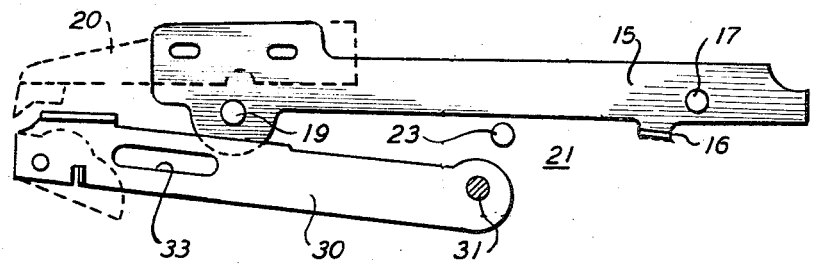
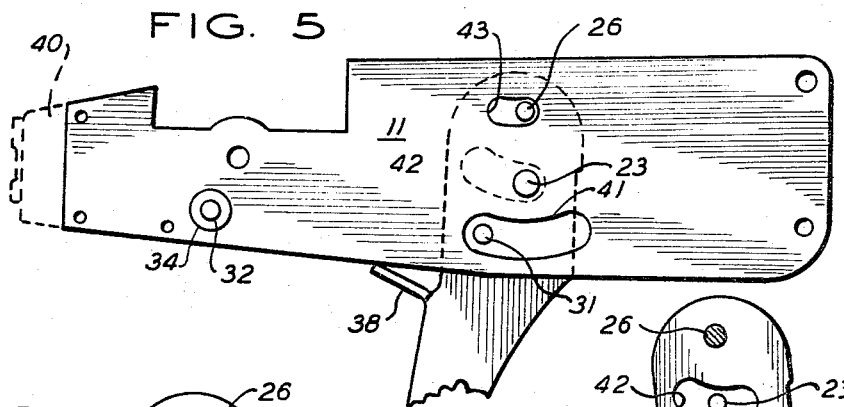
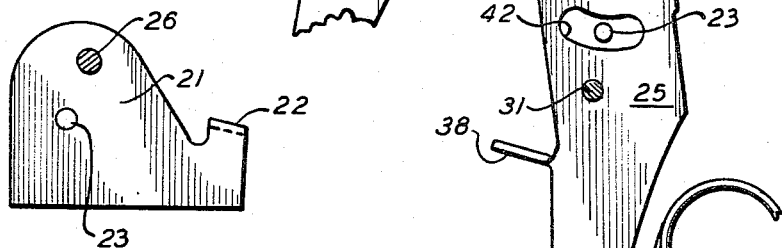
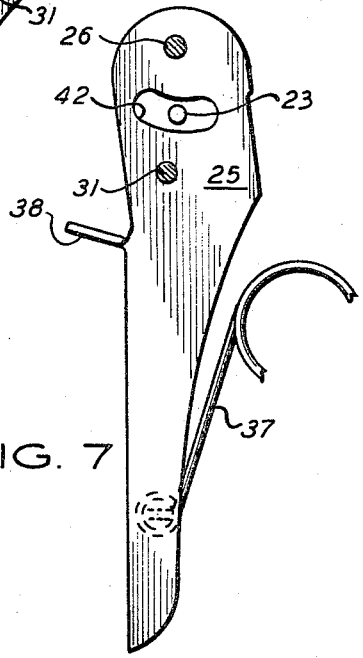
INVENTORS
G. R. LAWSON
G. C. BAILEY
BY
ATTORNEY

3,344,815
STRAP TIGHTENING AND CUTTING TOOL
Gustaf R. Lawson, Somerset, and George C. Bailey, East Orange, N.J., assignors to The Thomas & Betts Co., Elizabeth, N.J., a corporation of New Jersey
Filed Aug. 28, 1964, Ser. No. 392,782
15 Claims. (Cl. 140—123.6)

This invention relates to a strap tightening and cutting tool adapted to move a strap and tighten it around an article or group of articles, to a predetermined point, at which, on resistance of the strap to further movement, a cutter cuts the strap. The invention is especially adapted (but not limited) to applications, as above noted, wherein the strap is moved progressively relative to the tool thereby wrapping an article or articles under tension to a predetermined point, the strap then being cut. As an example of, but without limitation to, a strap in connection with which the invention may be used, reference may be made to patent no. 3,022,557 issued February 27, 1962.

The invention incorporates novel structural features directed toward the objectives herein noted, including the novel features of structure and operation such that the tool is accurate, rugged and durable in operation and substantially eliminates malfunctioning in use, as frequently encountered in tools for the purpose. The tool may be readily manipulated at the point of use without special precautions or instructions.

The drawings, illustrating procedures and devices useful in carrying out the invention, and the description below, are exemplary only of the invention, which shall be deemed to cover all other devices and procedures coming within the scope and purview of the appended claims.

In the drawings, wherein similar reference characters indicate like parts:

FIG. 1 is a side elevational, partly sectional, view of a strap tightening and cutting tool embodying the invention, FIG. 1a is a fragmentary view of a strap about to be tightened about a bundle of wire, FIG. 2 is a similar view, showing the strap being moved by the tool, FIG. 3 is a similar view, showing the position of the parts when, due to resistance of the strap to further movement by the tool, the rocker arm carrying the cutter is actuated, cutting the strap, FIG. 4 is an elevational view of the rocker arm and tension plate, showing, in dotted lines, a phantom view of a cam plate and cutter and the pawl associated with the tension plate, FIG. 5 is a fragmentary elevational view of the frame plate, and showing in dotted lines, a nose plate, and, fragmentarily, a handle which may be used in carrying out the invention, FIG. 6 is an elevational view of a cam plate which may be used in carrying out the invention, and FIG. 7 is an elevational view of a handle member which may be used in carrying out the invention.

As shown in the drawings, the device of the invention comprises a tool body 10 which may be formed of one or more parts (11, FIG. 5, 12 FIG. 1) secured together by suitable means to provide a casing having (FIG. 1) a pistol grip portion 13 and a horizontal portion 14. A rocker arm 15 (FIGS. 4 and 1), having a depending flange portion 16 for a purpose presently described, is connected, as by a pin 17, to a spring 18, normally urging the rocker arm (which is pivotally connected to casing 14 as at 19), in a clockwise direction (viewing the parts as in FIG. 1). Rocker arm 15 has a cutter 20 secured to one end thereof. A cam plate 21 (FIG. 6) is provided, having a flange 22 for engagement with flange 16 of the rocker arm 15 (FIG. 1), said cam plate 21 being mounted on the tool body as for rotation around the axis of a pivot pin 23 passing through an arcuate slot 42 (FIG. 7) in the handle and fixed to the tool body 11.

It will be noted that through its connection with the racker arm 15 the spring 18 normally urges the cam plate 21 in a clockwise direction (viewing the parts as shown in the drawing) and that it will be necessary for the cam to be rotated in a counterclockwise direction in order to similarly rotate the rocker arm 15, mocing the cutter end 20 of arm 15 downwardly for cutting the strap 24 (FIG. 3) at the predetermined point at which the strap has been sufficiently tightened around article A, the strap then exerting a tension greater than that of spring 18. In FIG. 1a the article A is illustrated as bundle of substantially parallel wires W which are encircled by a strap 24 that is about to be tightened. For simplicity, the two ends of the strap are shown as being passed through a conventional ferrule fastener F of the type which retains the straps in position after a desired tension is reached. Other suitable fasteners can be used equally as well.

Handle 25 is connected, as by pin 26, to cam plate 21 (FIG. 6) and has a slot 42 (FIG. 7) formed on a radius drawn from the pin 26. In the normal position of the parts as shown in the drawings the handle 25 will thus rotate on said radius (from pin 26) and the pin 26 acts normally as the pivot point for movement of the handle thus reciprocating in an arc 28 (FIG. 1). The handle 25 is connected as by pin 31 (FIG. 1) passing through a slot 41 in body plate 11 (FIG. 5) to tension plate 30, the tension plate, in turn, being mounted for sliding movement on a pin 32 (FIG. 3) on the tool body, freely received in a slot 33 in tension plate 30. The pin 32 has a roller 34 mounted thereon for a purpose presently described. A pawl 35 is pivotally mounted, as by a pin 36, on tension plate 30. A spring 37 engages the handle 25 and tool grip portion 13 at opposite ends (FIG. 1) and urges them apart; a stop finger 38 may be provided extending from the handle 24 for normal engagement with the tool body 10 (FIG. 1). The pawl 35 may be actuated by a spring or other means normally urging it counterclockwise (FIG. 2) onto the strap 24, and the tension plate 30 may have a flanged nosing 39 overlying the pawl 35 so that the strap 24 will be pressed by the pawl against the flange 39 and will so slide (FIG. 2) therewith on movement of the handle 25 toward grip portion 13. A nosing 40 (FIG. 1) may be secured to the front end of the tool body and medially slotted for registration of strap 24 intermediate the flange 39 and pawl 35. When the tension plate 30 is at its forward position (FIG. 1) responsive to spring 37, pawl 35 engages nosing 40 and is thus rotated (clockwise) clear of the strap 24. Likewise, when the pawl 35 strikes roller 34 it is thus rotated (clockwise) clear of the strap.

As the tension plate is (FIG. 2) moved from its forward (FIG. 1) position to its rearward position at which the lower end of the handle 25 strikes the lower end of the grip portion 13 or at which some other stop means is effective, the pawl 35 will have moved with the tension plate to the position at which the pawl will strike the roller 34 and thus the pawl is rotated clear of the strap 24.

In operation of the tool, pawl 35 engages (FIG. 2) the strap 24 on movement of the handle 25 toward the grip portion 13, the strap being correspondingly drawn to the right (viewing the parts as in FIG. 2). On release of handle 25 the tension plate 30 and pawl 35 return to their (FIG. 1) left end position wherein the pawl 35, striking the nosing 40 will thereby rotate (clockwise) and out of engagement with the strap 24. The strap will thus be progressively drawn through the tool and tensioned around any object A encircled thereby (FIGS. 1 and 1a). On release of the handle 25, the handle and the tension plate 30 will return to the FIG. 1 position. As the handle 25 is reciprocated toward and away from the grip portion 13 (arrow 28, FIG. 1) the strap will be progressively moved through the tool, successive portions of the strap being so moved through the tool until the strap offers sufficient tension, whereupon the handle 25 will no longer pivot on the point 26; on further movement of the handle 25 toward the grip portion 13, the pin 31 will become the pivot point for the handle; the pin 26 connection of the handle to the cam plate 21 will then cause rotation of the cam plate around the pin 23 (counterclockwise) the flanged ends 22, 16 of the cam plate and the rocker arm engaging, rotating the rocker arm, to move the cutter 20 downwardly, cutting the strap 24 (FIG. 3).

Having thus described our invention, what we claim as new and desire to secure by Letters Patent is:

1. In a strap tightening and cutting tool having a tool body and a grip portion:
    an arm movably connected to the tool body;
    a cutter portion for movement into cutting engagement with the strap on movement of the arm;
    yieldable holding means normally resisting the motion of the arm;
    means on said tool for moving the strap;
    a handle member;
    first connecting means connecting the handle member with the strap moving means so that movement of said handle member in one direction causes corresponding movement of said straps so as to tend to tighten said strap;
    and second connecting means connecting said handle member to said arm throughout the motion of said handle as said handle is moved in said one direction so that when motion of said handle places more than a predetermined amount of tension on said strap the second connecting means moves the arm and overcomes the resistance of said yieldable holding means so that the arm is rapidly moved;
    whereby the cutting means is rapidly brought into engament with the strip, to cut the strap when the strap has reached said predetermined tension.

2. The apparatus of claim 1 wherein said second connecting means has a cam surface thereon for engagement with said arm.

3. In a strap tightening and cutting tool as set forth in claim 1, wherein said holding means is a tension means engaging the arm and so normally holding the arm against movement.

4. In a strap tightening and cutting tool as set forth in claim 3, said tension means being spring means.

5. In a strap tightening and cutting tool as set forth in claim 1, said arm being a rocker arm so movably connected to the tool body by being pivotally connected thereto so that when the resistance of the yieldable holding means is overcome said rocker arm rapidly pivots about the pivotal connection.

6. In a strap tightening and cutting tool as set forth in claim 2, a pin connecting said handle and cam means.

7. In a strap tightening and cutting tool as set forth in claim 2, a pin rotatably connecting said cam means to the tool body.

8. A strap tightening and cutting tool as set forth in claim 7, including a pin connecting said handle and said cam plate at a point spaced from the pin so rotatably connecting said cam plate to the tool body.

9. In a strap tightening and cutting tool as set forth in claim 2, complementary flanges formed on said cam means and rocker arm members for interengagement thereof.

10. A strap tightening and cutting tool as set forth in claim 6, including a pin rotably connecting said cam means to the tool body said handle being provided with a slot for passage therethrough of the pin connecting the cam means to the tool body.

11. In a strap tightening and cutting tool as set forth in claim 1, spring means engaging the handle and normally resisting movement thereof.

12. In a strap tightening and cutting tool as set forth in claim 1, said means for moving the strap including a pawl movably positioned for engagement with the strap to hold the latter.

13. In a strap tightening and cutting tool as set forth in claim 12, a pawl disengaging means so juxtaposed on said tool as to be engaged by the pawl to move the latter out of engagement with the strap when the strap has been moved to a predetermined position.

14. A strap tightening and cutting tool as set forth in claim 12 including a spring means urging the pawl toward the strap;
    a pawl disengaging pin mounted on said tool;
    said first connecting means connecting the handle member with the strap having a slotted passageway therein, said pawl disengaging pin passing through said slotted passageway so as to disengage said pawl from said strap when said first connecting means and thereby said strap has been moved to a predetermined position by movement of said handle.

15. The apparatus of claim 14 wherein said pawl is pivotally mounted on said first connecting means.

References Cited

UNITED STATES PATENTS

| | | | |
|---|---|---|---|
| 2,175,478 | 10/1939 | McKee | 81—9.3 |
| 2,882,934 | 4/1959 | Gerrard | 140—123.6 |
| 3,169,560 | 2/1965 | Caveney et al. | 140—123.6 |

RICHARD J. HERBST, *Primary Examiner.*

E. M. COMBS, *Assistant Examiner.*